United States Patent
Yeung et al.

(10) Patent No.: US 12,115,449 B2
(45) Date of Patent: *Oct. 15, 2024

(54) DYNAMIC INTERACTIVE MEDIA FOR A PLAYSET

(71) Applicant: Disney Enterprises, Inc., Burbank, CA (US)

(72) Inventors: Jason A. Yeung, Glendale, CA (US); Nathan D. Nocon, Valencia, CA (US); Michael P. Goslin, Sherman Oaks, CA (US); Janice K Rosenthal, Burbank, CA (US); Hunter J. Gibson, Burbank, CA (US); Clifford Wong, Burbank, CA (US); Elliott H. Baumbach, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 17/494,948

(22) Filed: Oct. 6, 2021

(65) Prior Publication Data
US 2022/0023757 A1     Jan. 27, 2022

Related U.S. Application Data

(63) Continuation of application No. 16/874,174, filed on May 14, 2020, now Pat. No. 11,154,777.
(Continued)

(51) Int. Cl.
*A63F 13/47* (2014.01)
*A63F 13/23* (2014.01)
*A63F 13/428* (2014.01)

(52) U.S. Cl.
CPC .............. *A63F 13/47* (2014.09); *A63F 13/23* (2014.09); *A63F 13/428* (2014.09);
(Continued)

(58) Field of Classification Search
CPC .......... A63F 13/47; A63F 13/38; A63F 13/23; A63F 13/428; A63F 2300/1025;
(Continued)

(56) References Cited

U.S. PATENT DOCUMENTS 6,227,931 B1 * 5/2001 Shackelford ............. G09B 5/02
446/268
7,455,591 B2 * 11/2008 Nguyen .................... H04L 9/40
463/43
(Continued)

*Primary Examiner* — David L Lewis
*Assistant Examiner* — Matthew D Hoel
(74) *Attorney, Agent, or Firm* — Patterson + Sheridan, LLP

(57) ABSTRACT

A playset comprises a plurality of hotspots positioned within a plurality of scenes. A switching mechanism is configured to selectively couple to the each of the plurality of hotspots and is communicatively coupled with a controller. The controller is configured to establish communication with a first object using a first hotspot and determine an object type of the first object and a location of the first object within the playset. The location of the first object corresponds to a scene that contains the first hotspot. The controller is further configured to select an interactive media based on the object type and the location of the first object, select a first media file based on the selected interactive media, and instruct the first media file to be output on an output device.

20 Claims, 6 Drawing Sheets

Related U.S. Application Data

(60) Provisional application No. 62/992,034, filed on Mar. 19, 2020.

(52) U.S. Cl.
CPC ............... *A63F 2300/1025* (2013.01); *A63F 2300/6045* (2013.01); *A63F 2300/632* (2013.01)

(58) Field of Classification Search
CPC ....... A63F 2300/632; A63F 2300/6045; A63H 3/28; A63H 3/50; A63H 5/00; A63H 33/42; A63H 2200/00
See application file for complete search history.

(56) References Cited

U.S. PATENT DOCUMENTS

| | | | | |
|---|---|---|---|---|
| 8,038,532 B2* | 10/2011 | Neervoort | ............ | A63F 13/843 463/40 |
| 8,371,895 B1* | 2/2013 | Lam | ............ | A63H 3/36 446/108 |
| 8,784,197 B2* | 7/2014 | Alderucci | ............ | G07F 17/3237 463/29 |
| 9,586,139 B2* | 3/2017 | Jabara | ............ | H04W 8/186 |
| 9,662,571 B1* | 5/2017 | Jabara | ............ | A63F 13/327 |
| 10,179,283 B2* | 1/2019 | Barney | ............ | A63F 13/213 |
| 10,307,671 B2* | 6/2019 | Barney | ............ | A63F 13/245 |
| 10,525,357 B2* | 1/2020 | Alderucci | ............ | A63F 13/79 |
| 10,610,773 B2* | 4/2020 | Bellingham | ............ | G06K 7/10475 |
| 10,735,576 B1* | 8/2020 | Noonan | ............ | H04W 4/029 |
| 2011/0028219 A1* | 2/2011 | Heatherly | ............ | A63F 13/216 463/42 |
| 2012/0077593 A1* | 3/2012 | Sarmenta | ............ | A63F 13/98 463/40 |
| 2014/0176298 A1* | 6/2014 | Kumar | ............ | H04L 12/4625 340/4.42 |
| 2014/0181107 A1* | 6/2014 | Coburn, IV | ............ | H04N 21/4627 707/737 |
| 2014/0310316 A1* | 10/2014 | Coburn, IV | ............ | G06F 16/639 707/799 |
| 2014/0310597 A1* | 10/2014 | Triplett | ............ | H04L 12/2812 715/716 |
| 2014/0380159 A1* | 12/2014 | Reilly | ............ | H04R 29/007 715/716 |
| 2015/0018992 A1* | 1/2015 | Griffiths | ............ | H04N 21/43615 700/94 |
| 2015/0095679 A1* | 4/2015 | Gossain | ............ | G06F 1/3212 713/323 |
| 2015/0312622 A1* | 10/2015 | Candelore | ............ | H04N 21/4722 725/37 |
| 2015/0328541 A1* | 11/2015 | Van Haaften | ............ | A63F 1/02 463/42 |
| 2016/0121229 A1* | 5/2016 | Guo | ............ | A63H 3/28 446/175 |
| 2016/0136534 A1* | 5/2016 | Earl-Ocran | ............ | A63H 30/04 446/175 |
| 2017/0348593 A1* | 12/2017 | Barney | ............ | G06F 3/0487 |
| 2018/0214788 A1* | 8/2018 | Hornsby | ............ | A63H 33/26 |
| 2018/0250586 A1* | 9/2018 | Bellingham | ............ | H01Q 21/0025 |
| 2018/0290068 A1* | 10/2018 | Moody | ............ | A63H 33/042 |
| 2019/0009169 A1* | 1/2019 | Kessler | ............ | A63H 33/042 |
| 2021/0178272 A1 | 6/2021 | Nocon et al. | | |
| 2021/0184756 A1 | 6/2021 | Nocon et al. | | |
| 2021/0291052 A1* | 9/2021 | Yeung | ............ | A63F 13/428 |

* cited by examiner

DYNAMIC INTERACTIVE MEDIA FOR A PLAYSET

CROSS-REFERENCE TO RELATED APPLICATIONS

This application is a continuation of co-pending U.S. patent application Ser. No. 16/874,174, filed on May 14, 2020, which claims benefit of U.S. provisional patent application Ser. No. 62/992,034, filed on Mar. 19, 2020. Each of the aforementioned related patent applications is herein incorporated by reference in its entirety.

BACKGROUND

Playsets having interactive features provide an enhanced user experience. Commonly, playsets include video and/or sound playback features that may be triggered based on a user's actions. For example, as a user inserts, removes, or moves objects (e.g., a play piece or a game piece) within a playset, the playset initiates media playback. However, in current implementations, the available media playback options are limited and do not allow a user to dynamically alter the story or song driving the playback options. For example, once a story is started, a user is unable to alter the progression of the story, limiting the user experience.

Thus, there is a need for a playset that allows a user to dynamically adjust an interactive story or song of a playset to improve the user experience.

SUMMARY

In one embodiment, a playset comprises a plurality of scenes, a plurality of hotspots, and a switching mechanism. The plurality of hotspots is positioned within the plurality of scenes and configured to wirelessly couple with a first object. The switching mechanism is configured to selectively couple to the each of the plurality of hotspots. The switching mechanism is communicatively coupled with a controller. The controller is configured to establish communication with the first object using a first hotspot of the plurality of hotspots and determine an object type of the first object and a location of the first object within the playset. The location of the first object corresponds to one of the plurality of scenes that contains the first hotspot. The controller is further configured to select an interactive media based on the object type and the location of the first object, select a first media file based on the selected interactive media, and instruct the first media file to be output on an output device.

In one embodiment, a controller for a playset is configured to establish communication with a first object within the playset using a first hotspot of a plurality of hotspots. A switching mechanism is configured to selectively couple to each of the plurality hotspots and couple the plurality of hotspots with the controller. The controller is further configured to determine an object type of the first object and a location of the first object within the playset. The location of the first object corresponds to one of a plurality of scenes of the playset that contains the first hotspot. Further, the controller selects an interactive media based on the object type of the first object and the location of the first object, selects a first media file based on the selected interactive media, and instructs the first media file to be output on an output device.

In one embodiment, a method for interacting with a playset comprises establishing, via a switching mechanism, communication with a first object within the playset using a first hotspot of a plurality of hotspots. The switching mechanism is configured to selectively couple to each of the plurality hotspots. The method further comprises determining an object type of the first object and a location of the first object within the playset, the location of the first object corresponds to one of a plurality of scenes of the playset that contains the first hotspot. Further, the method comprises selecting an interactive media based on the object type of the first object and the location of the first object, selecting a first media file based on the selected interactive media, and instructing the first media file to be output on an output device.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Interactive playsets provide an improved user experience as compared to playsets that do not include interactive capabilities. However, current interactive playsets do not allow a user to alter the progression of a dynamic interaction (e.g., an interactive story or song), limiting the user experience. In the following description, an improved playset and method for interacting with a playset is described where altering the locations of the objects in playset alters the progression of a dynamic interaction. Accordingly, the user experience of the playset is improved from those using other designs.

Figure 1:
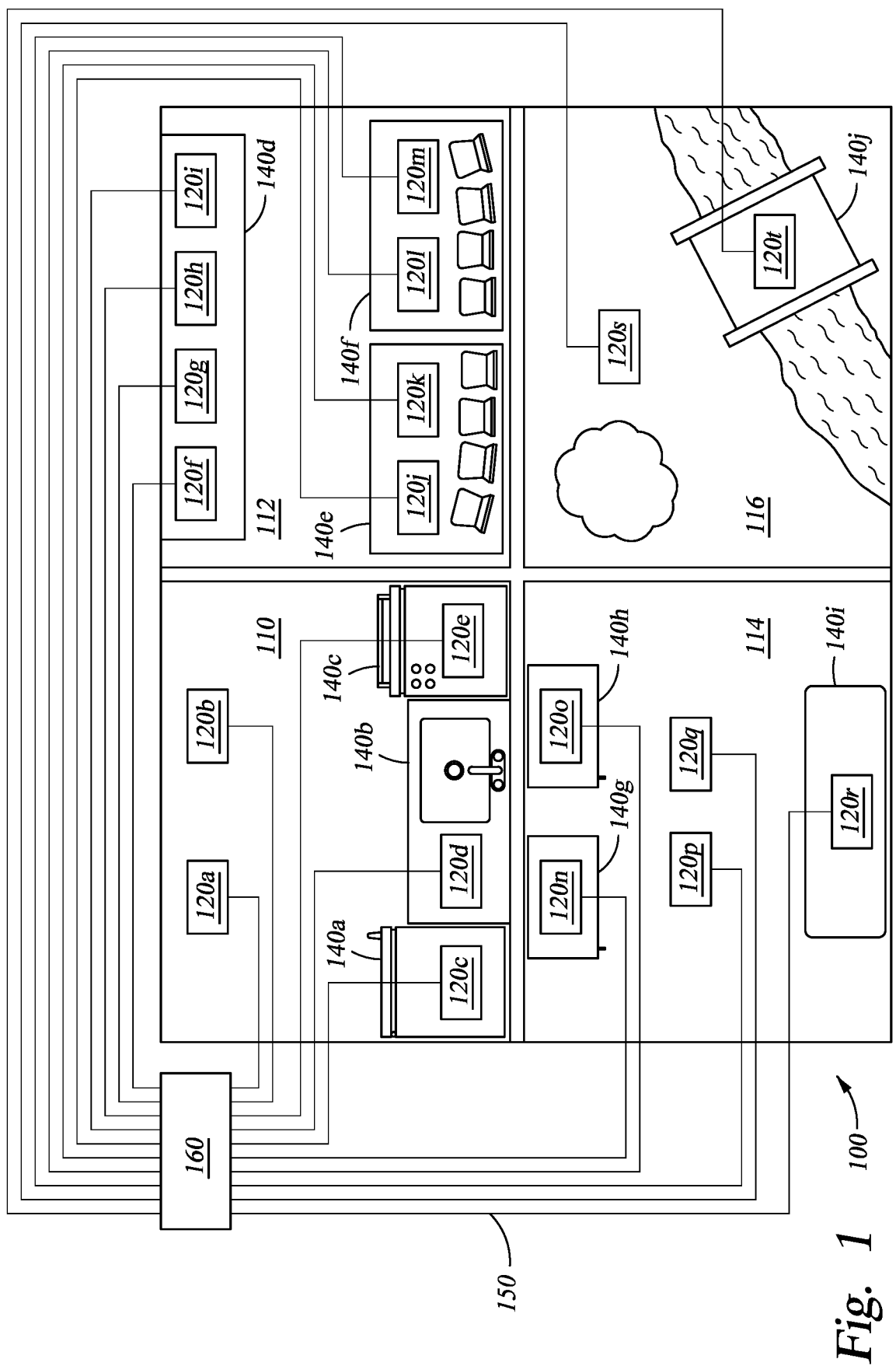
FIG. 1 is a block diagram of a playset, according to one or more embodiments.

FIG. 1 illustrates a playset 100, according to one or more embodiments. The playset 100 includes scenes 110-116, hotspots 120, connecting elements 150, and a switching mechanism 160. While the playset 100 is illustrated as included four scenes (e.g., scenes 110-116) in other embodiments, the playset 100 includes more than or less than four scenes.

The scenes 110-116 may correspond to indoor environments or outdoor environments. For example, scenes 110-116 corresponding to indoor environments may be different rooms of a building (e.g., the playset 100). In one example, one or more of the scenes 110-116 may be a room of a house, a room of a castle, or a room of an animal hospital, among others. One or more of the scenes 110-116 may be a kitchen, a bedroom, or a music room, among others. In embodiments where the playset 100 includes multiple buildings, a first one or more of the scenes 110-116 may correspond to a room of a first building and a second one or more of scenes 110-116 may correspond to a room of a second building. Further, in embodiments where the scenes 110-116 correspond to environments staged to resemble outdoor environments, one or more of the scenes 110-116 corresponds to mountains, rivers, beaches, and/or meadows, among others.

Each of the scenes 110-116 include one or more hotspots 120. For example, the scene 110 includes hotspots 120a-120e, the scene 112 includes hotspots 120f-120m, the scene 114 includes hotpots 120n-120r, and the scene 116 includes hotspots 120s-120t. The number of hotspots 120 in each scene 110-116 may be greater than or less than that illustrated in FIG. 1.

Figure 2A:
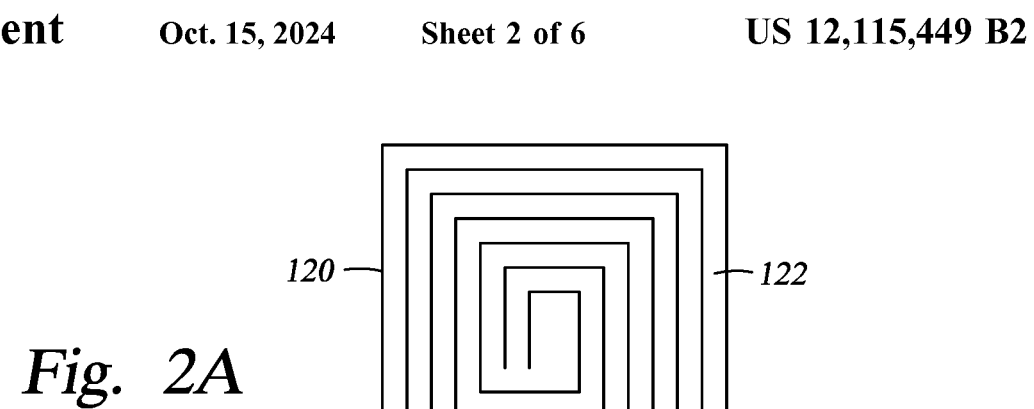
FIG. 2A illustrates an example hotspot, according to one or more embodiments.

In one embodiment, the hotspots 120 are near field communication (NFC) devices. The hotspots 120 include an antenna 122 as illustrated in FIG. 2A. The antenna 122 wirelessly communicates with an antenna on an object (e.g., the antenna 212 of the character 210, the antenna 222 of the character 210, the antenna 232 of the prop 230, and/or the antenna 242 of the prop 240 of FIGS. 2B and 2C, respectively). Alternatively, the hotspots 120 may be Bluetooth devices such as Bluetooth low energy (BLE) devices or the like.

The scenes 110-116 may include scene elements 140. For example, the scene 110 includes the scene elements 140a-140c which are associated with one or more hotspots 120. For example, the scene element 140a is associated with the hotspot 120c, the scene element 140b is associated with the hotspot 120d, and the scene element 140c is associated with the hotspot 120e. At least one of the scene elements 140 is associated with two or more hotspots 120. In one or more embodiments, a first scene element 140 is associated with different number of hotspots 120 than a second scene element 140.

The scene elements 140 may have a characteristic and/or shape that corresponds to the associated scene 110-116. For example, the scene 110 is a kitchen. Accordingly, the scene element 140a may be a refrigerator, the scene element 140b may be a sink, and the scene element 140c may be a range. The scene 112 is a music room and the scene element 140d is a stage and the scene elements 140e and 140f are stands or seating areas. The scene 114 is an animal hospital and the scene elements 140g and 140h are animal pens. In this example, the scene element 140i is an examination table. The scene 116 is a river scene, and the scene element 140j is a bridge. While specific scene types are described in the above, these are meant to be examples, and in other embodiments, the scenes 110-116 may correspond to different types of scenes.

The hotspots 120 are connected to the switching mechanism 160 via the connecting elements 150. Each of the connecting elements 150 may include one or more standard and/or impedance matched wires and/or cables.

The switching mechanism 160 selectively couples each of the hotspots 120 via a respective connecting element 150 to another device. For example, with reference to FIGS. 3 and 4, the switching mechanism 160 selectively couples each of the hotspots 120 via a respective connecting element 150 to the controllers 310 and 410. With reference to FIG. 5, the switching mechanism 160 selectively couples each of the hotspots 120 via a respective connecting element 150 to the antenna 510. The embodiments of FIGS. 3, 4, and 5 will be discussed in greater detail below.

The switching mechanism 160 provides a power signal to the hotspots 120 via the connecting elements 150. The switching mechanism 160 can receive the power signal from another device or the switching mechanism 160 generates the power signal.

The switching mechanism 160 sequentially cycles through the hotspots 120, sequentially coupling each of the hotspots 120 to a controller (e.g., the controller 310 or the controller 410 of FIGS. 3 and 4, respectively) or an antenna (e.g., the antenna 510 of FIG. 5). Alternatively, or additionally, the switching mechanism 160 non-sequentially cycles through the hotspots 120, non-sequentially coupling each of the hotspots 120 to a controller or an antenna. In one embodiment, the switching mechanism 160 non-sequentially cycles through the hotspots 120 such that the hotspots 120 may be dynamically selected in any order. The switching mechanism 160 selectively couples to each of the hotspots 120 for a common period of time. Alternatively, the switching mechanism 160 selectively couples to a first one or more hotspots 120 for a longer period of time than a second one or more hotspots 120.

In one embodiment, the switching mechanism 160 receives a control signal from a controller to determine the order to cycle through the hotspots 120. The control signal may provide an indication to the switching mechanism 160 to sequentially or non-sequentially cycle through the hotspots 120. Further, the control signal may initialize the switching mechanism 160 and is provided by a controller (e.g., the controller 310 or the controller 410 of FIGS. 3 and 4) or an antenna (e.g., the antenna 510 of FIG. 5). In one embodiment, when the switching mechanism 160 is first initialized, the switching mechanism 160 sequentially cycles through each of the hotspots 120. In response to an object being detected, the switching mechanism 160 may spend more time cycling through the hotspots of the scene determined to contain the object than other scenes. For example, the switching mechanism 160 may cycle through the hotspots of the scene or the scenes that contain the object N times (N is greater than 1) more than the other hotspots of scenes where objects are not located for a period of time.

Figure 2B:
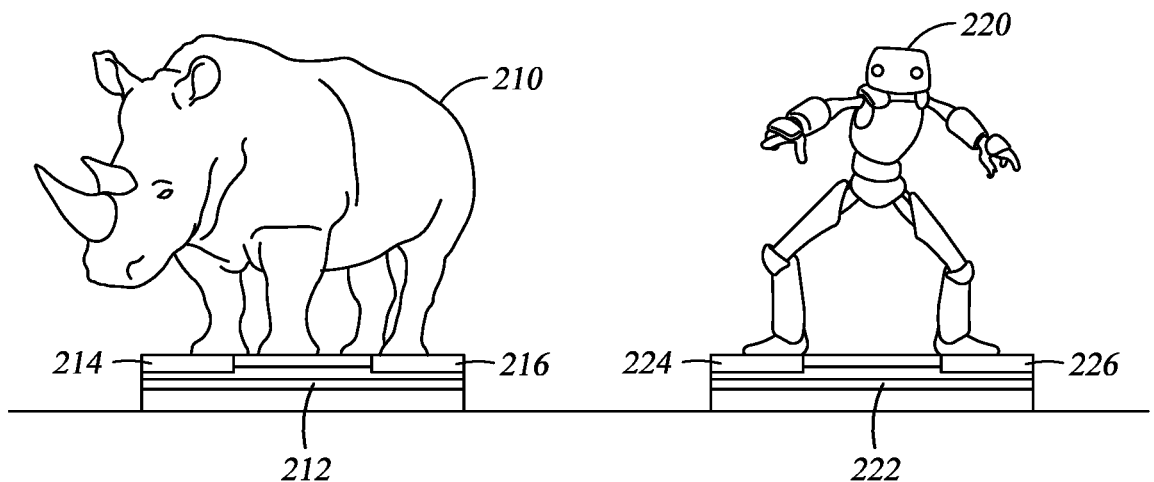
FIGS. 2B and 2C illustrate example objects, according to one or more embodiments.

FIG. 2B illustrates the character 210 including the antenna 212, a processor 214, and a memory 216. The processor 214 communicates with the memory 216 to retrieve object data and communicates this data via the antenna 212. The object data includes identification information for the character 210. For example, the identification information may include the object type "character" and the object identification (ID) (e.g., rhinoceros). In response to being positioned proximate a hotspot 120, a power signal is received from the hotspot 120 via the antenna 212. In response to receipt of the power signal, the processor 214 accesses the memory 216 to retrieve the object data and communicates the object data to the hotspot 120 via the antenna 212. The antenna 212 wirelessly receives the power signal. For example, the antenna 212 inductively receives the power signal.

FIG. 2B further illustrates the character 220 including the antenna 222, a processor 224, and a memory 226. The processor 224 communicates with the memory 226 to retrieve data and communicates the object data via the antenna 222. The object data includes identification information for the character 220. For example, the identification information includes the object type "character" and the object ID (e.g., robot). In response to being positioned proximate a hotspot 120, a power signal is received from the hotspot 120 via the antenna 222. In response to receipt of the power signal, the processor 224 accesses the memory 226 to retrieve the object data and communicates the object data to the hotspot 120 via the antenna 222. The antenna 222 wirelessly receives the power signal. For example, the antenna 222 inductively receives the power signal. While FIG. 2B illustrates specific characters (e.g., rhinoceros and robot), in other embodiments, other characters (e.g., snowman, princess, prince, king, knight, horse, and/or superhero, among others) may be utilized.

Figure 2C:
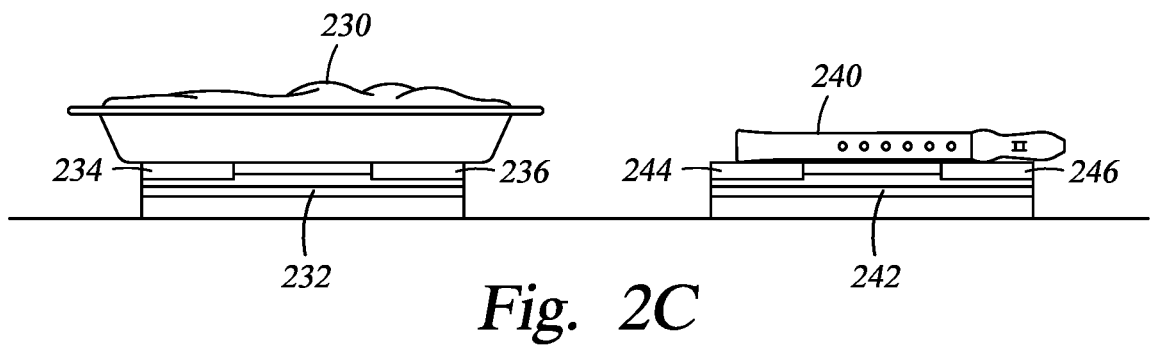

FIG. 2C illustrates the prop 230 including an antenna 232, a processor 234, and a memory 236. The processor 234 communicates with the memory 236 to retrieve object data and communicates this data via the antenna 232. The object data includes identification information for the prop 230. For example, the identification information includes the object type "prop" and the object ID (e.g., pie). In response to being positioned proximate a hotspot 120, a power signal is received from the hotspot 120 via the antenna 232. In response to receipt of the power signal, the processor 234 accesses the memory 236 to retrieve the object data and the processor 234 communicates the object data to the hotspot 120 via the antenna 232. The antenna 232 wirelessly receives the power signal. For example, the antenna 232 inductively receives the power signal.

FIG. 2C additionally illustrates the prop 240 including an antenna 242, a processor 244, and a memory 246. The processor 244 communicates with the memory 246 to retrieve object data and communicates this data via the antenna 242. The object data includes identification information for the prop 240. For example, the identification information includes the object type "prop" and the object ID (e.g., flute). The object ID may be used to determine a class of the object as is described with detail regard to FIG. 6. In response to being positioned proximate a hotspot 120, a power signal is received from the hotspot 120 via the antenna 242. In response to receipt of the power signal, the processor 244 accesses the memory 246 to retrieve the object data and the processor 244 communicates the object data to the hotspot 120 via the antenna 242. The antenna 242 wirelessly receives the power signal. For example, the antenna 242 inductively receives the power signal. While FIG. 2C illustrates specific props (e.g., pie and flute), in other embodiments, other props (e.g., cooking utensils, swords, toys, or clothes, among others) may be utilized.

One or more objects (e.g., one or more of the character 210, the character 220, the prop 230, and the prop 240) include a local power source (e.g., a battery). In such embodiments, the one or more objects do not wirelessly receive the power signal and are powered by the local power source instead.

Figure 3:
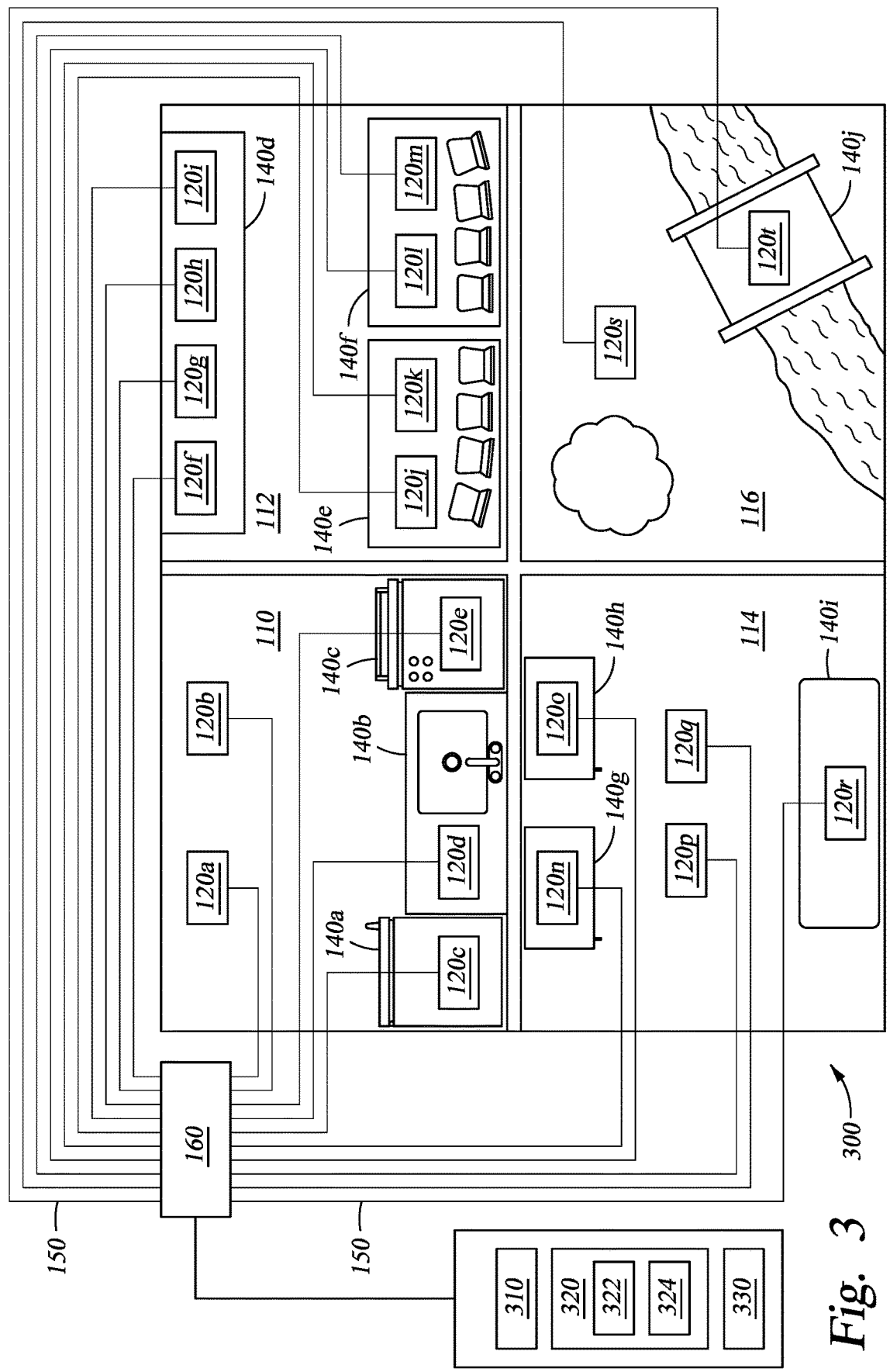
FIG. 3 is a block diagram of a playset, according to one or more embodiments.

FIG. 3 illustrates a playset 300, according to one or more embodiments. The playset 300 is configured similar to that of the playset 100. For example, the playset 300 includes scenes 110-116, hotspots 120, connecting elements 150, and the switching mechanism 160. The playset 300 additionally includes the controller 310.

The controller 310 may be any general purpose processor. For example, the controller 310 may be a central processing unit (CPU) or a microprocessor. The controller 310 is communicatively coupled with the switching mechanism 160. The controller 310 transmits one or more control signals to the switching mechanism 160 to control how the switching mechanism 160 cycles through the hotspots 120. Additionally, or alternatively, the controller 310 transmits one or more power signals to the switching mechanism 160. A first power signal powers the switching mechanism 160. A second power signal is communicated to the hotspots 120 by the switching mechanism 160 to power the hotspots 120 and corresponding objects.

The controller 310 is coupled to the memory 320 (e.g., a computer readable storage medium) that includes a playback generator 322 and multi-media files 324. The multi-media files 324 include audio files, image files, and/or video files. The playback generator 322 generates an interactive media (e.g., an interactive story or song) based on the object data received from the objects (e.g., the character 210 and/or the prop 230) coupled to the hotspots 120. Generating the interactive media may include outputting audio, video, and/or image files and based on the objects and location of objects within the playset. Generating the interactive media is described in more detail with regard to FIG. 6. Further, through the following document, where an interactive story is described, the corresponding description is also applicable to an interactive song.

The playset 300 further includes an output device 330 which includes a speaker and/or a display device. The controller 310 is configured to output audio, video, and/or image files retrieved from the memory 320 via the output device 330 based on the interactive media generated by the playback generator 322.

Figure 4:
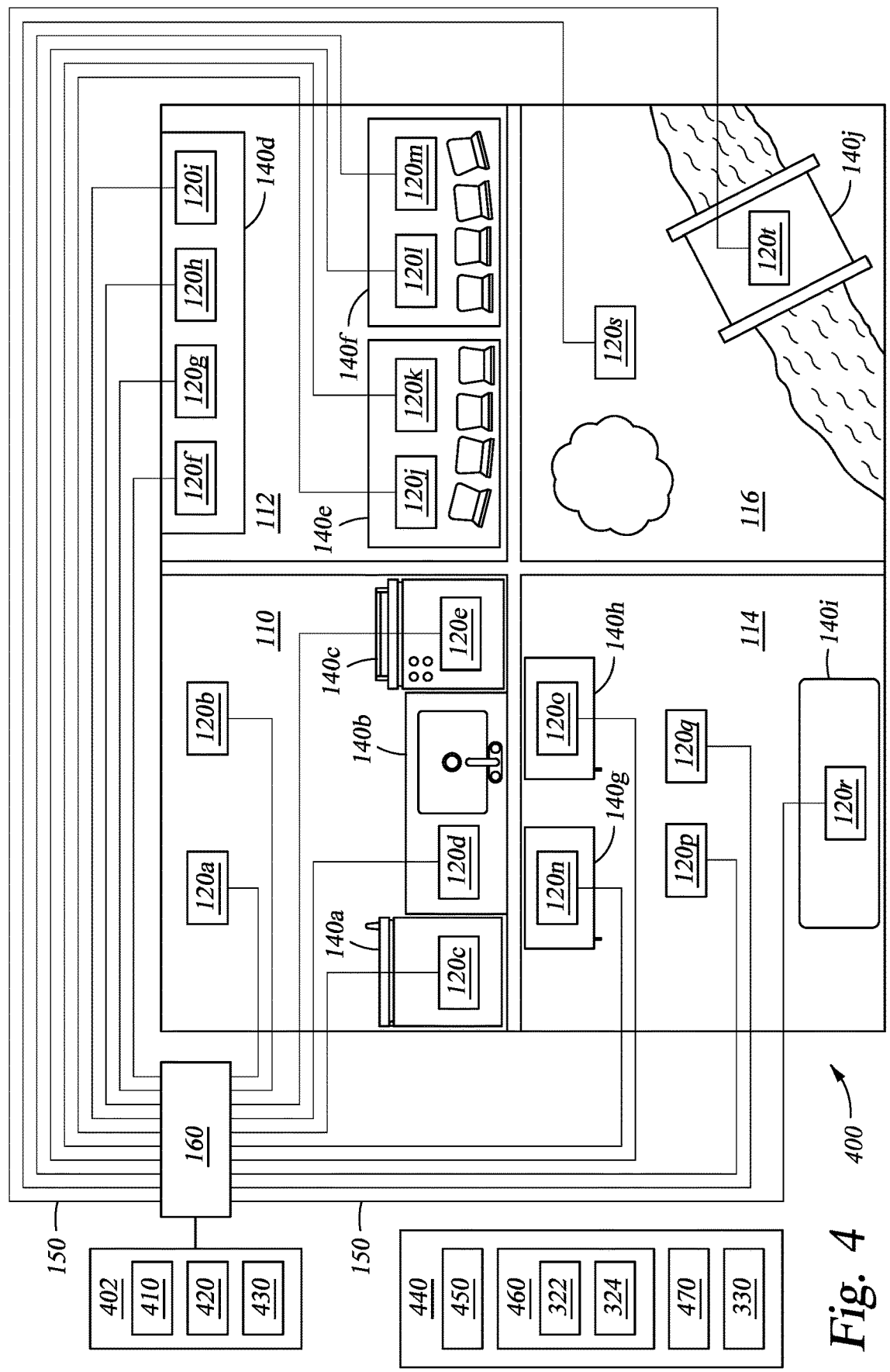
FIG. 4 is a block diagram of a playset, according to one or more embodiments.
Figure 5:
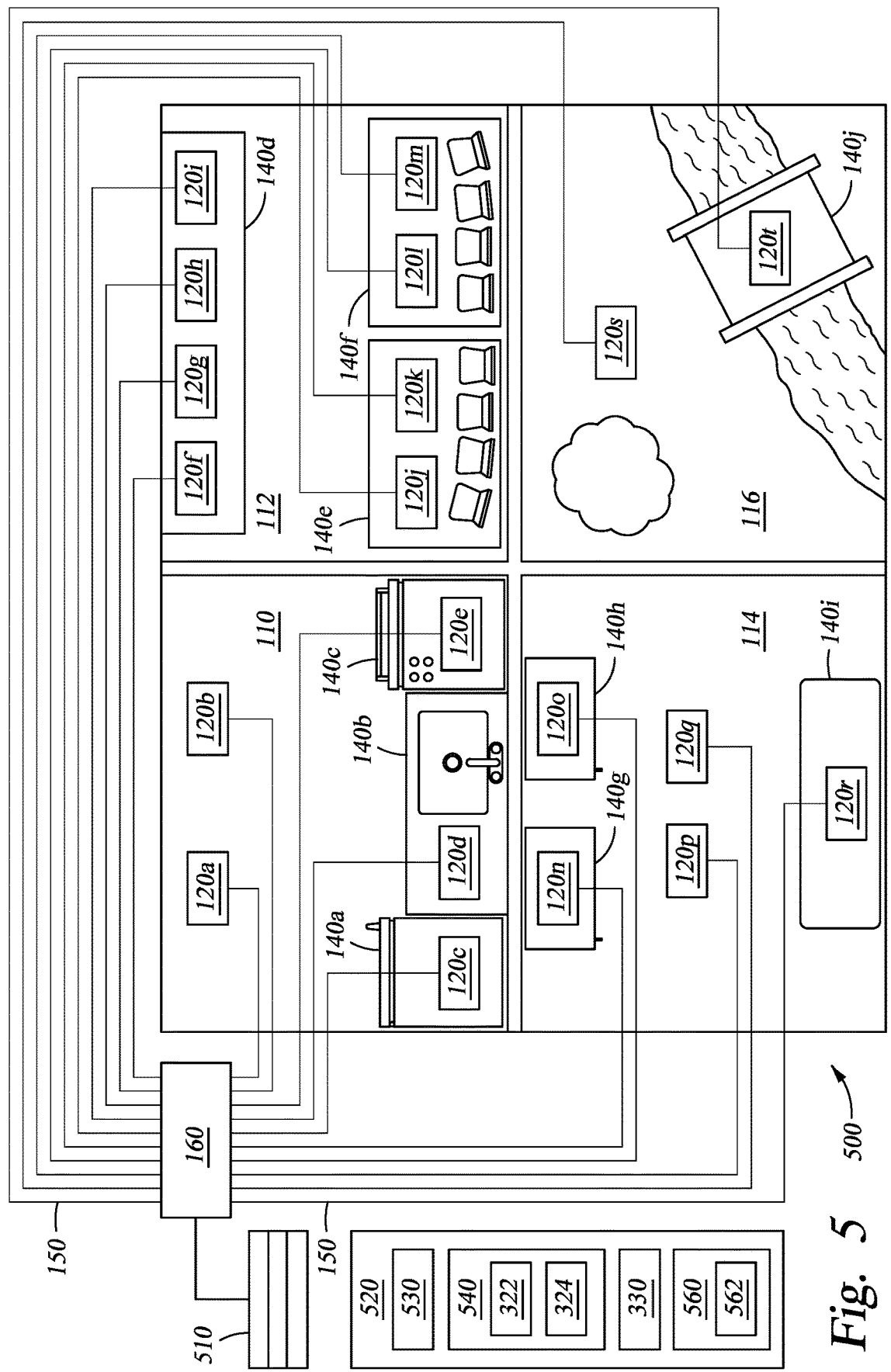
FIG. 5 is a block diagram of a playset, according to one or more embodiments.

FIG. 4 illustrates a playset 400, according to one or more embodiments. The playset 400 is configured similar to that of the playset 100. For example, the playset 400 includes scenes 110-116, hotspots 120, connecting elements 150, and the switching mechanism 160. The playset 400 additionally includes a wireless device 402. The wireless device 402 may be a Bluetooth device or a wireless local area network (WLAN) device. In one embodiment, the wireless device 402 is a BLE device. As compared to the playset 300, the playset 400 outputs data corresponding to an object to the electronic device 440 to be output by the output device 330 of the electronic device 440.

The wireless device 402 includes a controller 410, a communication device 420, and a memory 430. The controller 410 may be any general purpose processor. For example, the controller 410 may be a microcontroller or CPU. The controller 410 is communicatively coupled with the switching mechanism 160 and may transmit one or more control signals to the switching mechanism 160 to control how the switching mechanism 160 cycles through the hotspots 120. Additionally, or alternatively, the controller 410 transmits one or more power signals to the switching mechanism 160. A first power signal powers the switching mechanism 160. A second power signal is communicated to the hotspots 120 by the switching mechanism 160 to power the hotspots 120 and proximate objects. In one embodiment, a first power signal powers the switching mechanism 160 and is also communicated to the hotspots 120 by the switching mechanism to power the hotspots 120 and proximate objects.

The controller 410 is coupled to the communication device 420. The communication device 420 communicates data received from the objects (e.g., the character 210 and/or the prop 230) coupled to the hotspots 120 to an external device (e.g., the electronic device 440). The communication device 420 may include a wireless or wired transmitter and/or a receiver that communicatively couples to a corresponding wireless or wireless transmitter and/or receiver in the electronic device 440.

The memory 430 is a computer readable storage medium that stores object data received from the hotspots 120 so that the object data may be communicated via the communication device 420 to the electronic device 440.

The electronic device 440 includes a controller 450, a memory 460, a communication device 470, and the output device 330. The electronic device 440 may be a personal computer, mobile phone, tablet, or a television, among others. The controller 450 may be any general purpose processor, e.g., a microprocessor or CPU. The controller 450 may communicate control signals via the wireless device 402 to the switching mechanism 160 to control how the switching mechanism 160 cycles through the hotspots 120. For example, the communication device 470 communicates with the communication device 420 of the wireless device 402

The controller 450 is coupled to the memory 460 (e.g., a computer readable storage medium) that includes the playback generator 322 and the multi-media files 324. The playback generator and multi-media files 324 are described in greater detail with regard to FIG. 3. The controller 450 is configured to output audio, video, and/or image files retrieved from the memory 460 via the output device 330 based on the interactive story generated by the playback generator 322.

The communication device 470 transmits data to and receives data from the communication device 420. For example, the communication device 470 receives data corresponding to the objects coupled to the hotspots 120 from the communication device 420 and transmits control signals to the communication device 420. The output device 330 is part of the electronic device 440. The output device 330 may be a speaker or display device and is described in greater detail with regard to FIG. 3.

FIG. 5 illustrates a playset 500, according to one or more embodiments. The playset 500 is configured similar to that of the playset 100. For example, the playset 500 includes scenes 110-116, hotspots 120, connecting elements 150, and the switching mechanism 160. The playset 500 additionally includes an antenna 510 coupled to the switching mechanism 160. Further, the antenna 510 couples with an antenna of an NFC device 560 of the electronic device 520. The electronic device 520 may be a personal computer, a mobile phone, tablet, a television, or a reader, among others. As compared to the embodiments of FIGS. 3 and 4, in the embodiment of FIG. 5, the electronic device 520 wireless communicates with the NFC device 560 to receive the data corresponding to the object. Further, as compared to the playsets 300 and 400, the playset 500 may not include a local controller, and instead all of the data processing is completed within the controller 530 of the electronic device 520.

The electronic device 520 includes a controller 530, a memory 540, the output device 330, and the NFC device 560. The controller 530 may be any general purpose processor.

The controller 530 is coupled to the memory 540 (e.g., a computer readable storage medium) that includes the playback generator 322 and the multi-media files 324, both of which are described in greater detail above. In one embodiment, the controller 530 outputs audio, video, and/or image files retrieved from the memory 540 via the output device 330 based on the interactive story generated by the playback generator 322.

The NFC device 560 can be a radio-frequency identification (RFID) device or a BLE device, among others. In embodiments where the NFC device 560 is an RFID device, the NFC device 560 includes an antenna 562 that communicates wirelessly with the antenna 510. In one embodiment, the NFC device 560 provides one or more power signals to the antenna 510 (e.g., a passive RFID device) via the antenna 562. The NFC device 560 may also communicate one or more control signals to the antenna 510 via the antenna 562. The NFC device 560 receives object data (e.g., from the antenna 510 via the antenna 562.

Figure 6:
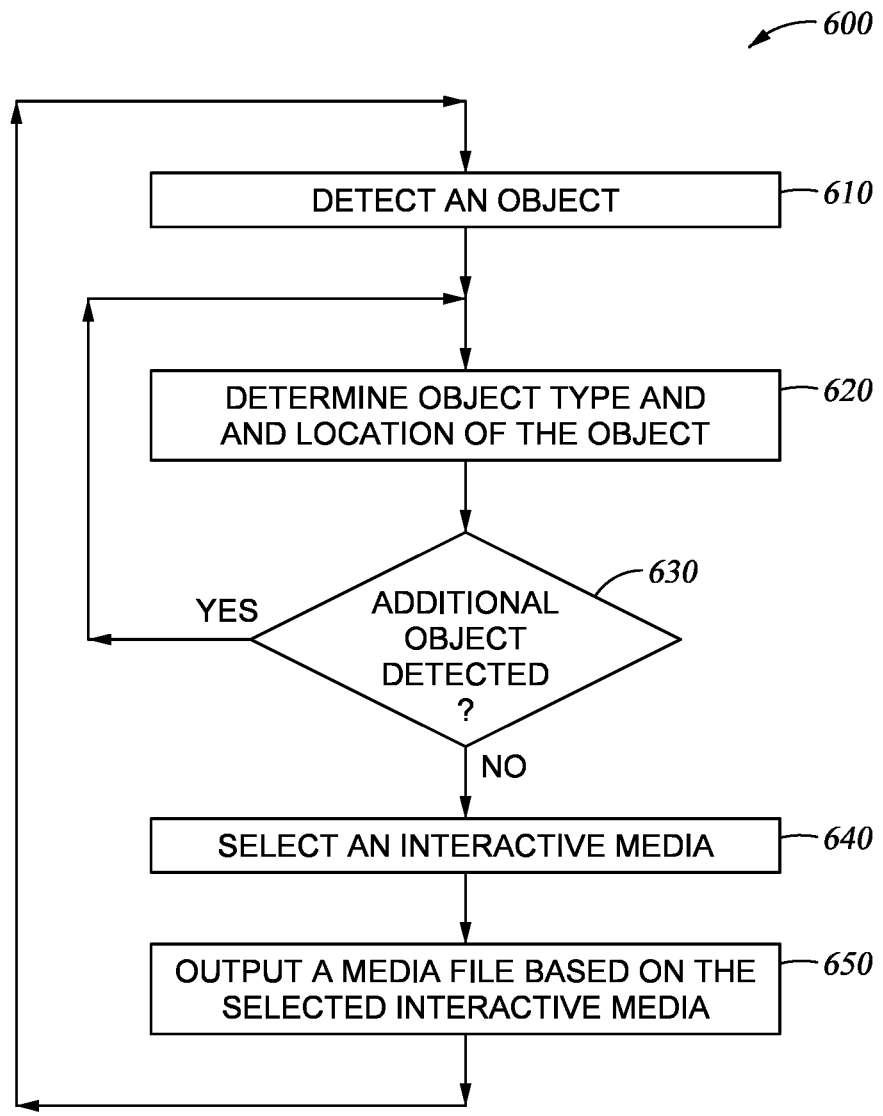
FIG. 6 is a flowchart of a method for interacting with a playset, according to one more embodiments.

FIG. 6 illustrates a method 600 for interacting with a playset (e.g., the playset 100, 300, 400, and/or 500), according to one or more embodiments. At block 610, a controller (e.g., the controller 310, 410, or 530) establishes communication with an object (e.g., the character 210 or 220 or the props 230 or 240 of FIGS. 2B and 2C, respectively) to detect the object within a playset. For example, to establish a communication with an object, the switching mechanism 160 cycles through the hotspots 120 to establish a communication with one or more objects positioned adjacent to one or more hotspots 120. In one embodiment, the switching mechanism 160 sequentially cycles through each of the hotspots 120. In another embodiment, the switching mechanism 160 dynamically cycles through the hotspots 120.

With reference to FIG. 3, the controller 310 is coupled to the switching mechanism 160 and provides the switching mechanism 160 with one or more control signals and/or one or more power signals to initiate or control establishing communication with an object. The one or more control signals initializes the switching mechanism 160 and/or controls how the switching mechanism 160 cycles through the hotspots 120. The one or more power signals power the switching mechanism 160 and/or are coupled to the hotspots 120 via the switching mechanism 160 to power an object positioned proximate one of the hotspots 120. The switching mechanism 160 can also transmit one of the power signals to the hotspots 120 to power an object positioned proximate the hotspots 120. For example, when the character 210 is positioned adjacent to the hotspot 120a, the antenna 212 of the character 210 wirelessly couples with the antenna 122 of the hotspot 120. Accordingly, a power signal is coupled via the switching mechanism 160, a connecting element 150, and the antenna 122 of the hotspot 120a to the antenna 212 of the character 210. Additionally, the processor 214 of the character 210 wirelessly communicates object data associated with the character 210 to the controller 310 via the antenna 212, the antenna 122 of the hotspot 120a, a connecting element 150 and the switching mechanism 160 in response to receipt of the power signal.

With reference to FIG. 4, the controller 410 is coupled to the switching mechanism 160 and provides the switching mechanism 160 with one or more control signals and/or one or more power signals to initiate or control establishing communication with an object. The one or more control signals initializes the switching mechanism 160 and/or controls how the switching mechanism 160 cycles through the hotspots 120. The one or more power signals power the switching mechanism 160 and/or are coupled to the hotspots 120 via the switching mechanism 160 to power an object positioned proximate one of the hotspots 120. For example, a power signal is coupled via the switching mechanism 160, one of the connecting elements 150, and the antenna 122 of the hotspot 120a to the antenna 212 of the character 210. The character 210 communicates object data associated with the character 210 to the controller 410 in response to receipt of the power signal.

With reference to FIG. 5, the NFC device 560 is wirelessly coupled to the antenna 510 and provides the switching mechanism 160 with one or more power signals and, in one or more embodiments, one or more control signals to initiate or control establishing communication with an object. The one or more control signals initializes the switching mechanism 160 and/or controls how the switching mechanism 160 cycles through the hotspots 120. In one embodiment, the one or more power signals power the switching mechanism 160 and/or are coupled to the hotspots 120 via the switching mechanism 160 to power an object wirelessly coupled to the hotspots 120. Once powered, the character 210 communicates data associated with the character 210 to the antenna 510 of the NFC device 560 via the antenna 212, the antenna 122 of the hotspot 120a, a connecting element 150, the switching mechanism 160, and the antenna 510.

At block 620, the playback generator 322 executing on the controller 310, 410, or 510 determines the object type of an object and location of the object. The playback generator 322 determines the object type for an object based on the object data provided by an object adjacent to a powered hotspot. For example, after receiving power, an object (e.g., the characters 210 and 220 and the props 230 and 240) transmits associated object data. The playback generator 322 utilizes the object data to determine the object type and object ID of an object. For example, the playback generator 322 utilizes the object data to determine whether the object type is character or prop and identifies the object ID of an object. The playback generator 322 may also determine the object class (e.g., person, animal, hero, food item, accessory, or instrument, among others) of an object. With reference to FIG. 2B, the playback generator 322 determines that an object 220 has an object type of "character," an object ID of "robot", and object class of "hero" from the associated object data. Further, the playback generator 322 determines that the prop 230 of FIG. 2C has an object type of "prop," an object ID of "flute", and object class of "instrument."

The playback generator 322 further determines the location of an object within the playset by identifying the hotspot that is wirelessly coupled to the object. The playback generator 322 may determine the hotspot wirelessly coupled to an object based on the cycling sequence of the switching mechanism 160. The playback generator 322 receives information regarding the cycle sequence from the switching mechanism 160 or from a controller (e.g., the controller 310, 410, or 530). In one example, the playback generator 322 utilizes a mapping of the hotspots to scenes to determine in which scene the detected hotspot is located. For example, the playback generator 322 can use a mapping stored within memory 320 to determine that the hotspot 120a is positioned within the scene 112. In one embodiment, the switching mechanism 160 communicates hotspot information corresponding to the currently driven hotspot to the controller 310, 410, or 510. In response to receiving object data, the controller 310, 410, or 510, or the playback generator 322 executing on the controller 310, 410, or 510 identifies the currently driven hotspot from the hotspot information and identifies the associated scene from the identified hotspot based on the mapping information.

At block 630, the playback generator 322 executing on the controller 310, 410, or 510 determines whether an additional object is detected within the playset. For example, the switching mechanism 160 cycles through each of the remaining hotspots 120 to determine whether an additional object is wirelessly coupled to one of the hotspots 120. The remaining hotspots are the hotspots not scanned before a previous object was detected. For example, if an object was detected to be wirelessly coupled to hotspot 120f, the switching mechanism 160 may have cycled through hotspots 120a-120e before the object was detected at hotspot 120f. Accordingly, the remaining hotspots are hotspots 120g-120t, and, during block 630, the switching mechanism 160 cycles through the hotspots 120g-120t to detect additional objects. In the above example, the switching mechanism 160 cycles through the hotspots 120 sequentially. Alternatively, the switching mechanism 160 cycles through the hotspots 120 non-sequentially and the remaining hotspots may be any hotspots not previously driven.

If an additional object is detected, block 620 is repeated on the detected additional object to determine the object type and location of the object as is described above. However, if no additional objects are detected, the method 600 proceeds to block 640.

At block 640, the playback generator 322 executing on the controller 310, 410, or 510 selects an interactive media selected based on at least the object type and the location of the detected one or more objects. If a single object is detected, the playback generator 322 selects an interactive media from the memory 320 according to the object type of the object and the location of the object within the playset. If multiple objects are detected, the playback generator 322 selects an interactive media from the memory 320 according the object type of each of the objects and the location of each of the objects within the playset. The playback generator 322 selects the interactive media from a list of interactive media stored within the memory 320. Each of the interactive media is associated with the object type of one or more objects and the location of one or more objects.

In one embodiment, in response to a determination that a detected object is located within the scene 110, the playback generator 322 selects an interactive media associated with a kitchen. Alternatively, the playback generator 322 selects an interactive media associated with a music room in response to determining that that an object is located within the scene 112. In response to a determination that an object is located within the scene 114, the playback generator 322 selects an interactive media associated with an animal hospital, and in response to a determination that an object is located within the scene 116, the playback generator 322 selects an interactive media associated with an outdoor environment including a river.

The playback generator 322 may select an interactive media based on the determination a first object is located in a first scene and a second object is located in a second scene. In such an embodiment, the interactive media is associated with the first and second objects and the first and second scenes. Additionally, or alternatively, the playback generator 322 may select an interactive media based on the determination that a first object and second object are located in the same scene. That is, the playback generator 322 may select a different interactive media when two objects are in different scenes than when the two objects are in the same scene.

The playback generator 322 may further select the interactive media from a list of interactive media based on an object type of each detected object. Further, the playback generator 322 can select the interactive media based on an object ID and an object class of each detected object. For example, by varying the combination of objects and scenes, different interactive media is selected.

For example, with reference to FIG. 2B, the playback generator 322 can select an interactive media corresponding to an object type "character" and an object ID "rhinoceros" when the character 210 is detected to be wirelessly coupled to one of the hotspots 120. Alternatively, the playback generator 322 may select a different interactive media presentation that correspond to an object type "character" and an object ID "robot" when the character 220 is detected at one of the hotspots 120. Further, when both the character 210 and the character 220 are detected to be wirelessly coupled to corresponding ones of the hotspots 120, the playback generator 322 selects an interactive media corresponding to an object type "character" and an object ID "rhinoceros" according to the character 210 and the object type "character" and an object ID "robot" according to the character 220, which may be a different interactive media than when only one of these objects is detected in the playset In response to detecting that the character 210 is wirelessly coupled to the hotspot 120a, an interactive story associated with both a kitchen and a rhinoceros is selected. For example, the selected interactive story has setting of a kitchen and involves a character of a rhinoceros. However, if the character 220 is detected is be wirelessly coupled to the hotspot 120a, the selected interactive story has a setting of a kitchen, but, instead involves a character of a robot. Further, if the character 210 is detected to be wirelessly coupled to the hotspot 120u, the setting of the interactive story may be a river scene and the interactive story involves a snowman. If the character 210 is detected to be wirelessly coupled to the hotspot 120s and the character 220 is detected to be wirelessly coupled to the hotspot 120t, the setting of the interactive story may be a river scene and the interactive story involves a rhinoceros and a robot. Accordingly, by varying the combination of objects, and the locations of the objects, differ interactive stories are selected.

Alternatively, the interactive media is an interactive song. Accordingly, the playback generator 322 selects an interactive song based on the object type and detected location of one or more objects. For example, the selected interactive song corresponds to the one or more objects and/or the location of the one or more objects. For example, if a detected object is character 220 and is located in the scene 110 (e.g., a kitchen), the interactive song includes lyrics associated with a rhinoceros being in a kitchen and/or preparing food. Further, if the character 210 is detected to be wirelessly coupled to the hotspot 120s and the character 220 is detected to be wirelessly coupled to the hotspot 120t, the setting of the interactive song may be a river scene and the interactive song involves a rhinoceros and a robot. Accordingly, by varying the combination of objects, and the locations of the objects, different interactive songs are selected.

The playback generator 322 may select an interactive song instead of an interactive story based on a mode of the playset. For example, the playset may be placed in an interactive story mode or interactive song mode. The mode of the playset may be detected by the playback generator 322 and used to select an interactive song or interactive story. The playset may include a switch (e.g., a physical or software switch) that changes modes. Alternatively, the playback generator 322 includes a switch that changes modes between an interactive story mode and an interactive song mode. The playback generator 322 may switch between an interactive story mode and an interactive song mode based on a detected object and/or an input received by a user. For example, based on a determination that one of the detected objects has an object type of prop, a mode of the playset and/or the playback generator is changed based on the object ID and/or object class of the detected object. For example, in response to detecting the prop 240, the mode may be changed from an interactive story mode to an interactive song mode. The change in mode is based on the determination that the prop 240 has an object ID of flute and/or an object class of instrument. Accordingly, the playback generator 322 either selects an interactive song or adds an interactive song to a current interactive story. In response to a detection that the prop 240 has been removed from the playset, the mode of the playset returns to an interactive story mode and the previous interactive story is resumed or a new interactive story is started.

At block 650, an output device outputs a media file based on the selected interactive media (e.g., the selected interactive story or interactive song) which can be an audio file, video file, or image file. Different media files are selected based on the selected interactive story. For example, in response to an interactive story that corresponds to the character 210 and the scene 110, a media file associated with a rhinoceros being in kitchen is selected and output. Each of the media files may include one or more tags that associates them with one or more interactive stories. In the above example, where a rhinoceros is positioned in a kitchen, the media file may be an audio file, image file, and/or video file that corresponds to baking or cooking and may be in the voice of the rhinoceros or include an image and/or video of the rhinoceros entering and/or interacting with the kitchen. Further, an audio and/or video file of files associated with a rhinoceros and a robot being outside may be output based on an interactive song that corresponds to characters 210 and 220 determined to be in the scene 116. The audio and/or video files may include music and lyrics played and/or sung by the rhinoceros and robot.

Interactive stories may be pre-generated and stored in the memory 320. Alternatively, the interactive stories are generated by the playback generator 322. In one embodiment, the interactive stories include an interactive storyline that changes based on the different combinations of objects and locations of the objects within the playset. In one embodiment, the interactive stories are dynamically created and may differ each time a user interacts with the playset. The interactives stories include one or more branches. The branches are determined based on the detected objects and locations of the objects. As objects are added to the playset, moved within the playset, and/or removed from the playset, the storyline of the interactive story progresses. The branches of the storyline of the interactive story are selected based on adding objects to the playset, moving objects within the playset, and/or removing objects from the playset.

Interactive songs may be pre-generated and stored in the memory 320. Alternatively, the interactive songs are generated by the playback generator 322. The interactive stories include interactive lyrics that correspond to and are changed based on the different combinations of objects and locations of the objects within the playset. The interactive songs may be dynamically created and may differ each time a user interacts with the playset. For example, in response to detecting two objects having a character type in the playset, an interactive song that is a duet is detected. Alternatively, in response to detecting one object having a character type an interactive song that is a solo is detected. The interactives songs include one or more branches. The branches are determined based on the detected objects and locations of the objects. As objects are added to the playset, moved within the playset, and/or removed from the playset, the interactive song progresses through the verses of the interactive song. The branches of the interactive song are selected based on adding objects to the playset, moving objects within the playset, and/or removing objects from the playset.

Blocks 610-650 may be repeated to dynamically update the interactive media and generate additional media files for outputting. For example, blocks 610-650 may be completed a first time during a first time period to detect objects within a playset, select an interactive media, and output a media file as is described above. During subsequent time periods (e.g., a second time period, a third time period, and a fourth time period, etc.) the blocks 610-650 are repeated and the interactive media is updated and additional media files are selected and outputted. The selected interactive media is dynamically updated (e.g., progresses through a storyline or song verses) as the blocks 610-650 are repeated. For example, in an embodiment where the interactive media is an interactive story, as objects are moved with the playset, removed from the playset, or added to the playset, the playback generator 322 progresses through the storyline of the interactive story. In an embodiment, where the interactive media is an interactive song, as objects are moved with the playset, removed from the playset, or added to the playset, the playback generator 322 progresses through the verses of the interactive song. In one or more embodiments, as objects are added to the playset, moved in the playset, and/or removed from the playset, the interactive story or song is adjusted to explain why an object was added, moved, and/or removed and corresponding media files are output.

During each instance of block 610, the playback generator 322 detects objects added to a playset, moved within a playset, or removed from a playset.

During each instance of block 620, the playback generator 322 determines the object type of each object added to the playset and the scene corresponding to the added and/or the scene corresponding to the removed objects or moved objects. In one embodiment, the playback generator 322 determines that an object has been moved within the playset based on the object data provided by an object. For example, if the object data of an object detected to be wirelessly coupled to a second hotspot matches the object data of an object detected to be wirelessly coupled to the first hotspot and the object is determined to not be wirelessly coupled to the first hotspot, the object is determined to be moved. However, if the object data of a second object detected proximate a second hotspot does not match the object data of a previously detected object, the second object is determined to be a new object added to the playset.

During each instance of block 640, the playback generator 322 updates an interactive media by progressing through the different branches (e.g., storylines of an interactive story or verses of an interactive song) of an interactive media, updating the interactive media. For example, in response to the determination that a second character (e.g., the character 220) is added to a scene (e.g., one of scenes 110-116) with the first character, the playback generator 322 updates an interactive story by selecting a branch of a storyline of an interactive story that incorporates a rhinoceros and a robot. The media file output by the output device 330 is associated with the change in relationship between the objects in the scene and the updated interactive story. In one embodiment, the media file of the character 210 greeting the character 220 is selected to be output by the output device 330. Alternatively, if a character is removed from a scene, the interactive story is updated to reflect that the character has been removed from the scene. Further, the resulting audio file, video file, and/or image file may be of another character waving and/or saying "good-bye" to the character removed from the scene.

In various embodiments, as characters are removed from one scene and added to another scene, the playback generator 322 detects the movement of the characters from scene to scene and a corresponding interactive story is updated and a corresponding media file is output. For example, when a character is moved from the scene 110 to the scene 116, the interactive story is updated to reflect that a character has been moved from scene 110 to the scene 116, and an audio file, image file, and/or video file of the character saying "let's go outside" or moving outside is selected and outputted.

Props object types may be utilized to augment how a character object type interacts with a scene. For example, in response to detecting that the prop 230 was added to the scene 110 with the character 210, the story line of a selected interactive story is changed to include a rhinoceros and a pie. Based upon a detection that the prop 230 was positioned adjacent to an oven of the scene 110, the storyline of the interactive story is selected correspondingly and a corresponding media file may be selected. For example, an audio file, image file, and/or video file of the character saying "let's bake a pie" and/or an image or video of a pie being baked is outputted by the output device 330.

The playback generator 322 may generate prompts (e.g., audio prompts, image prompts and/or video prompts) requesting that objects be added, moved, or removed from the playset. The prompts may request specific object types be added, moved, or removed from the playset. Alternatively, the prompts may request that objects be placed in specific scenes of the playset. The prompts are based on the current interactive media and/or a timeout period. For example, the playback generator 322 may determine that the objects have not been added, removed, or moved for "M" seconds or minutes and generates a prompt requesting that objects be added, moved, or removed from the playset. "M" may be a timeout period of one or more seconds.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An interactive device comprising:
a plurality of hotspots comprising antennas and configured to wirelessly communicate with an antenna of a first object; and
a switching mechanism configured to selectively couple to the each of the plurality of hotspots via connecting elements, wherein the switching mechanism is communicatively coupled with a controller that is configured to:
determine an object type of the first object and a location of the first object based on a signal received from the first object via a first hotspot of the plurality of hotspots, wherein the location of the first object corresponds to a location of the first hotspot;
select an interactive media based on the object type and the location of the first object; and
instruct a first media file of the selected interactive media to be output on an output device.

2. The interactive device of claim 1, wherein the controller is further configured to:
determine, via a second hotspot of the plurality of hotspots, an object type of a second object and a location of the second object, and wherein selecting the interactive media based on the object type and the location of the first object is further based on the object type and the location of the second object.

3. The interactive device of claim 1, wherein the first media file is instructed to be output during a first time period, and during a second time period that occurs after the first time period, the controller is further configured to:
determine, via a second hotspot of the plurality of hotspots, an object type of a second object and a location of the second object;
update the selected interactive media based on the object type of the second object and the location of the second object; and
instruct a second media file of the updated interactive media to be output on the output device.

4. The interactive device of claim 1, wherein the controller is further configured to:
determine, via a second hotspot of the plurality of hotspots, a change of location of the first object;
update the selected interactive media based on the change of location of the first object; and
instruct a second media file of the updated interactive media to be output on the output device.

5. The interactive device of claim 1, wherein the interactive media comprises a plurality of branches, and wherein the first media file corresponds to a first branch of the plurality of branches.

6. The interactive device of claim 1, wherein the selected interactive media is an interactive story comprising a storyline associated with the object type and the location of the first object, or the selected interactive media is an interactive song comprising verses associated with the object type and the location of the first object.

7. The interactive device of claim 1, wherein the switching mechanism is configured to selectively couple to each of the plurality of hotspots based on a control signal received from the controller.

8. The interactive device of claim 1, wherein the first hotspot is configured to receive a power signal from the switching mechanism and wirelessly communicate the power signal to the first object.

9. The interactive device of claim 1, wherein the plurality of hotspots are positioned within a plurality of scenes, and wherein the plurality of scenes correspond to one or more of indoor environments and outdoor environments.

10. The interactive device of claim 1, wherein the controller is configured to determine, via the first hotspot, the object type of the first object and the location of the first object based on the switching mechanism coupling to the first hotspot.

11. A hardware controller configured to:
determine an object type of a first object and a location of the first object based on a signal received from the first object via a first hotspot of a plurality of hotspots, wherein the location of the first object corresponds to a location of the first hotspot, and an antenna of the first object wirelessly communicates with an antenna of the first hotspot within an interactive device, and wherein the plurality of hotspots is coupled to a switching mechanism via connecting elements, the switching mechanism configured to couple the plurality of hotspots with the controller;
select an interactive media based on the object type of the first object and the location of the first object; and
instruct a first media file of the selected interactive media to be output on an output device.

12. The controller of claim 11 further configured to:
determine, via a second hotspot of the plurality of hotspots, an object type of a second object and a location of the second object, and wherein selecting the interactive media based on the object type and the location of the first object is further based on the object type and the location of the second object.

13. The controller of claim 11 further configured to, during a second time period:
determine, via a second hotspot of the plurality of hotspots, an object type of a second object and a location of the second object;
update the selected interactive media based on the object type of the second object and the location of the second object; and
instruct a second media file of the updated interactive media to be output on the output device, wherein the first media file is instructed to be output during a first time period, the first time period occurs before the second time period.

14. The controller of claim 11 further configured to:
determine a change of location of the first object;
update the selected interactive media based on the change of location of the first object; and
instruct a second media file of the updated interactive media to be output on the output device.

15. The controller of claim 11 further configured to communicate a control signal to the switching mechanism, wherein the switching mechanism is configured to selectively couple to each of the plurality of hotspots based on the control signal.

16. A method comprising:
determining an object type of a first object and a location of the first object based on a signal received from the first object via a first hotspot of a plurality of hotspots, wherein the location of the first object corresponds to a location of the first hotspot, wherein an antenna of the first object wirelessly communicates with an antenna of the first hotspot within an interactive device, and the plurality of hotspots is coupled to a switching mechanism via connecting elements;
selecting an interactive media based on the object type of the first object and the location of the first object; and
instructing a first media file of the selected interactive media to be output on an output device.

17. The method of claim 16 further comprising:
determining an object type of a second object and a location of the second object, wherein the second object wirelessly communicates with a second hotspot of the plurality of hotspots, and wherein selecting the interactive media based on the object type and the location of the first object is further based on the object type and the location of the second object.

18. The method of claim 16 further comprising, during a second time period,
determining an object type of a second object and a location of the second object, wherein the second object wirelessly communicates with a second hotspot of the plurality of hotspots;
updating the selected interactive media based on the object type of the second object and the location of the second object; and
instructing a second media file of the updated interactive media to be output on the output device, wherein the first media file is instructed to be output during a first time period, the first time period occurs before the second time period.

19. The method of claim 16 further comprising:
determining a change of location of the first object;
updating the selected interactive media based on the change of location of the first object; and
instructing a second media file of the updated interactive media to be output on the output device.

20. The method of claim 16 further comprising communicating a control signal to the switching mechanism, wherein the switching mechanism is configured to selectively couple to each of the plurality of hotspots based on the control signal.

* * * * *

UNITED STATES PATENT AND TRADEMARK OFFICE
CERTIFICATE OF CORRECTION

| | | |
|---|---|---|
| PATENT NO. | : 12,115,449 B2 | Page 1 of 1 |
| APPLICATION NO. | : 17/494948 | |
| DATED | : October 15, 2024 | |
| INVENTOR(S) | : Jason A. Yeung et al. | |

It is certified that error appears in the above-identified patent and that said Letters Patent is hereby corrected as shown below:

In the Specification

In Column 7, Line 12, delete "402" and insert -- 402. --.

In Column 10, Line 17, after "according" insert -- to --.

In Column 10, Line 29, delete "that that" and insert -- that --.

In Column 11, Line 4, delete "playset" and insert -- playset. --.

In Column 11, Line 10, delete "is be" and insert -- is --.

Signed and Sealed this
Fourteenth Day of January, 2025

Derrick Brent
*Acting Director of the United States Patent and Trademark Office*